(12) United States Patent
Paragios et al.

(10) Patent No.: US 7,200,269 B2
(45) Date of Patent: Apr. 3, 2007

(54) NON-RIGID IMAGE REGISTRATION USING DISTANCE FUNCTIONS

(75) Inventors: Nikolaos Paragios, Plainsboro, NJ (US); Mikael Rousson, Preaux (FR); Visvanathan Ramesh, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 682 days.

(21) Appl. No.: 10/356,055

(22) Filed: Jan. 31, 2003

(65) Prior Publication Data

US 2003/0235337 A1 Dec. 25, 2003

Related U.S. Application Data

(60) Provisional application No. 60/353,371, filed on Feb. 1, 2002.

(51) Int. Cl.
*G06K 9/62* (2006.01)
*G06F 7/60* (2006.01)

(52) U.S. Cl. .......................... 382/215; 703/2
(58) Field of Classification Search ................ 382/215
See application file for complete search history.

(56) References Cited

U.S. PATENT DOCUMENTS 5,596,428 A * 1/1997 Tytgat et al. ............... 358/518
5,633,951 A * 5/1997 Moshfeghi ................. 382/154
6,591,004 B1 * 7/2003 VanEssen et al. ........... 382/154
2004/0170323 A1 * 9/2004 Cootes et al. ............... 382/199
2005/0027492 A1 * 2/2005 Taylor et al. ................. 703/2

OTHER PUBLICATIONS

T. Katila et al. (Eds.): FIMH 2001, LNCS 2230, pp. 53-60, 2001. □□Springer-Verlag Berlin Heidelberg 2001.*
Stiller, Christopher and Konrad, Janusz; Estimating Motion in Image Sequences; Jul. 1999; IEEE Processing Magazine; pp. 70-91.*
Dufaux, Frederic and Konrad, Janusz; Efficient, Robust, and Fast Global Motion Estimation for Video Coding; Mar. 2000; IEEE Transactoins on Image Processing, vol. 9, No. 3; pp. 497-501.*

* cited by examiner

*Primary Examiner*—Joseph Mancuso
*Assistant Examiner*—Hadi Akhavannik
(74) *Attorney, Agent, or Firm*—Donald B. Paschburg; F. Chau & Associates, LLC

(57) ABSTRACT

A system and method for non-rigid image registration using distance functions includes portions for receiving a source shape into an image space, integrating a global linear registration model with local deformations to assess the source shape, optimizing a functional defined on a parameter or feature space where the functional quantifies the similarity between the source shape and a target shape in terms of distance functions, creating an augmented registration space including a plurality of target shape clones coherently positioned in the image space, tracking moving interfaces between the source shape and the target shapes and clones through a level set method, and registering the source shape by seeking mutual correspondences between the source shape, the target shape and the target shape clones.

21 Claims, 12 Drawing Sheets

(i.1)

(ii.1)

(ii.2)

NON-RIGID IMAGE REGISTRATION USING DISTANCE FUNCTIONS

CROSS-REFERENCE TO RELATED APPLICATION

This application claims the benefit of U.S. Provisional Application Ser. No. 60/353,371, filed Feb. 1, 2002 and entitled "Matching Distance Functions: A Shape-to-Area Variational Approach for Global-to-Local Registration", which is incorporated herein by reference in its entirety.

BACKGROUND

Image registration is a challenging application in computer vision and image processing. It is encountered in fields such as remote sensing, biomedical imaging, data indexing and retrieval (e.g., digital libraries), surveillance, post-production (e.g., tracking, stereo reconstruction from multiple views), and the like. Many of these applications involve data from multiple modalities (e.g., biomedical imaging) that provide complementary information. However, in order to be properly used, an integration/combination/fusion step is called for. Various applications in computer vision require the extraction of specific structures of interest, namely the segmentation of the visual information. Despite the fact that these structures have similar origins, they can present certain degrees of variability.

The cardiac example in biomedical imaging is typical. The heart shape varies across age, gender, ethnicities and the like. Additionally, the cardiac shape can be corrupted by cardiovascular diseases. In medical image analysis, there is a strong need for image and shape alignment. The outcome of this process can be used as a clinical tool. Document image analysis and pattern recognition are also areas where shape registration and alignment are important. Here, the writing patterns differ between individuals although they refer to the same basis of letters.

The recognition problem may be appropriately solved if shapes are first aligned. The problem of registering geometric shapes is a complex issue in vision, graphics and medical imaging. It has been studied in various forms. A general registration formulation can be stated as: given two shapes, an input D and a target S, and a dissimilarity measure; find the best transformation that associates to any point of D a corresponding point at S and minimizes the dissimilarity measure between the transformed shape V and the target S. This dissimilarity can be defined either along the contour for shape-based techniques or in the entire region for area-based techniques, as determined by the contour. The shape registration problem can be separated from the shape recognition problem. In the recognition scenario, correspondences between the shapes can be considered known. Then the objective is to find from a given set of examples the shape that provides the lower dissimilarity measurement with the target. Alternatively, methods that do not require correspondence and are based on the comparison of some global shape characteristics have also been investigated for shape recognition.

SUMMARY

These and other drawbacks and disadvantages of the prior art are addressed by a system and method for non-rigid registration using distance functions.

A system and corresponding method for non-rigid image registration using distance functions includes portions for receiving a source shape into an image space, integrating a global linear registration model with local deformations to assess the source shape, optimizing a functional defined on a parameter or feature space where the functional quantifies the similarity between the source shape and a target shape in terms of distance functions, creating an augmented registration space including a plurality of target shape clones coherently positioned in the image space, tracking moving interfaces between the source shape and the target shapes and clones through a level set method, and registering the source shape by seeking mutual correspondences between the source shape, the target shape and the target shape clones.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches non-rigid image registration using distance functions in accordance with the following exemplary figures, in which.

DETAILED DESCRIPTION OF PREFERRED EMBODIMENTS

1. Introduction

The present disclosure addresses the registration of geometric shapes. A primary feature is the use of a simple and robust shape representation with distance functions for global-to-local alignment. A rigid-invariant variational framework is provided that can deal well with local non-rigid transformations. The registration map includes a linear motion model and a local deformations field, incrementally recovered. In order to demonstrate the performance of the selected representation, a simple criterion is considered, the sum of square differences. Empirical validation and promising results were obtained with examples that exhibited large global motion as well as important local deformations and arbitrary topological changes.

The present disclosure is directed towards the registration aspect rather than the matching and the recognition of shapes. Shape alignment and registration were considered under different views. Their classification is not straightforward although the use of the following criteria is a reasonable selection: (i) Nature and Domain of Transformation and (ii) Optimization Procedure. A component of the registration procedure is the underlying motion model or nature of transformation, which is used to map the source shape to the target. The selection of the motion transformation affects the performance of the registration procedure.

Figure 1:
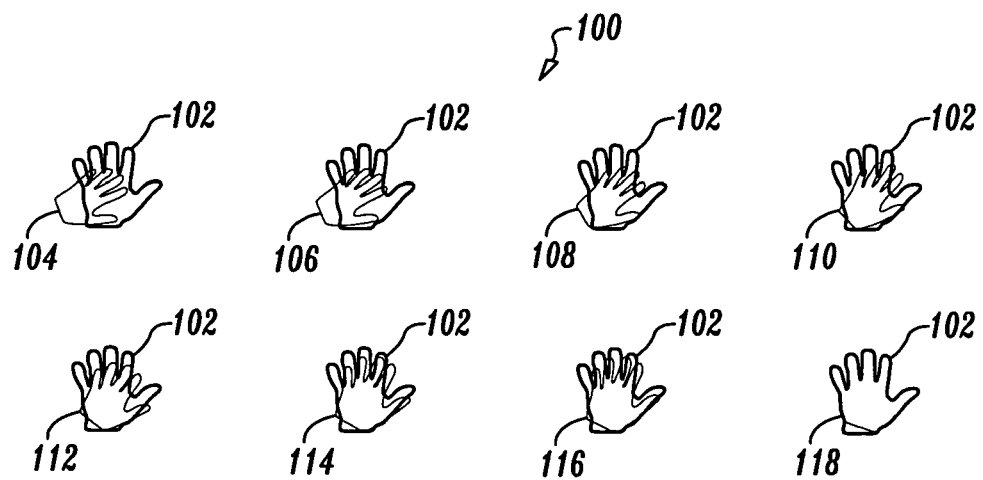
FIG. 1 shows a schematic representation of an exemplary rigid hand registration with synthetic motion.

As shown in FIG. 1, an exemplary rigid hand registration with synthetic motion is indicated generally by the reference numeral 100. Here, the rigid hand 102 is overlaid by sequential motion representations 104 through 118, respectively.

Figure 2:
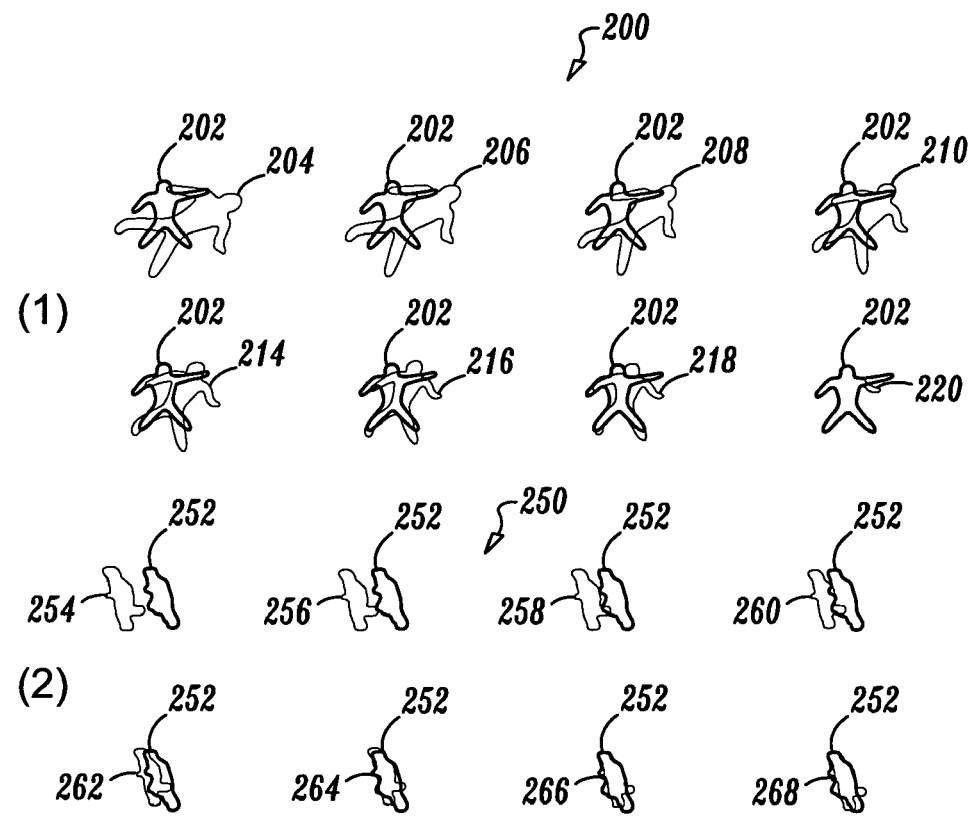
FIG. 2 shows a schematic representation of (1) a rigid body registration with synthetic motion and different subjects, and (2) a rigid body registration with real motion.

Turning to FIG. 2, (1) shows a rigid body registration with synthetic motion and different subjects, indicated generally by the reference numeral 200, and (2) shows a rigid body registration with real motion indicated generally by the reference numeral 250. A first rigid subject 202 is overlaid by sequential motion representations 204 through 220, respectively. A second rigid subject 252 is overlaid by sequential motion representations 254 through 268, respectively.

Figure 3A:
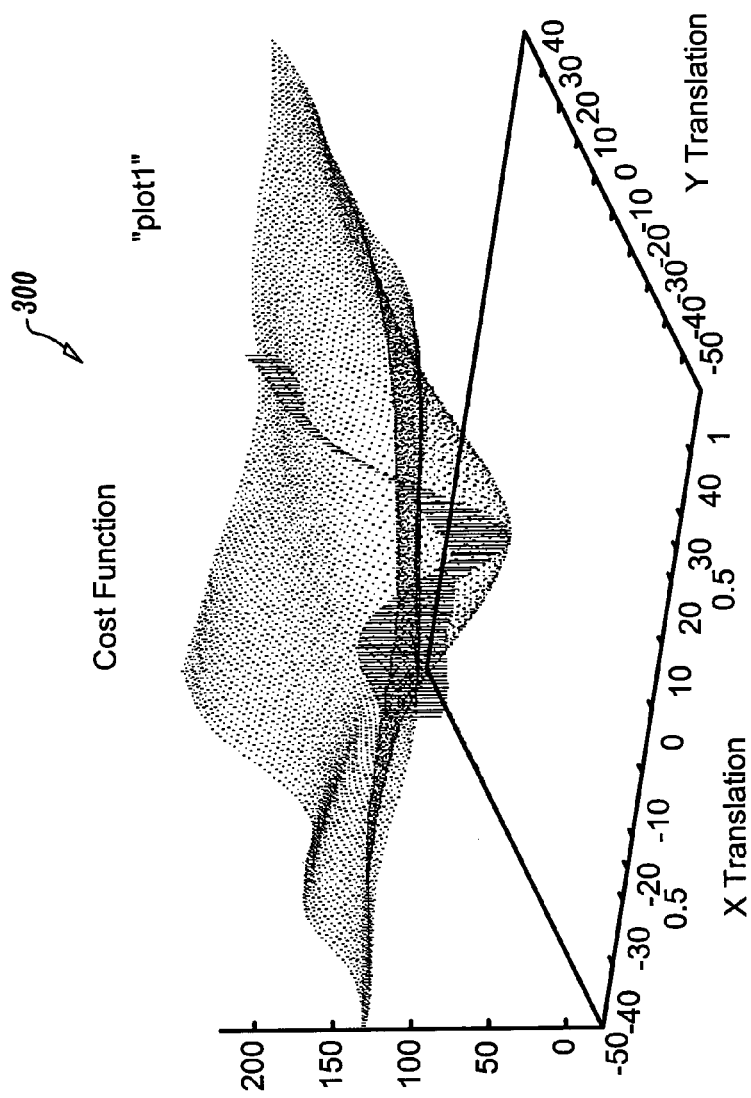
FIG. 3 shows a schematic representation of the performance of the disclosed module under various initial conditions with empirical evaluation of the cost function, where scale and rotation are known but translation is to be recovered in (i.1), translation in x and scale are known but translation in y and rotation are to be recovered in (i.2), translation in x and rotation are known but translation in y and scale are to be recovered in (ii.1), and translation in x and translation in y are known but rotation and scale are to be recovered in (ii.2)
Figure 3:
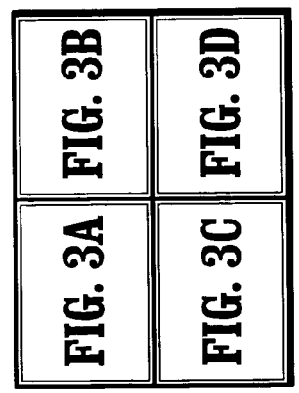
Figure 3B:
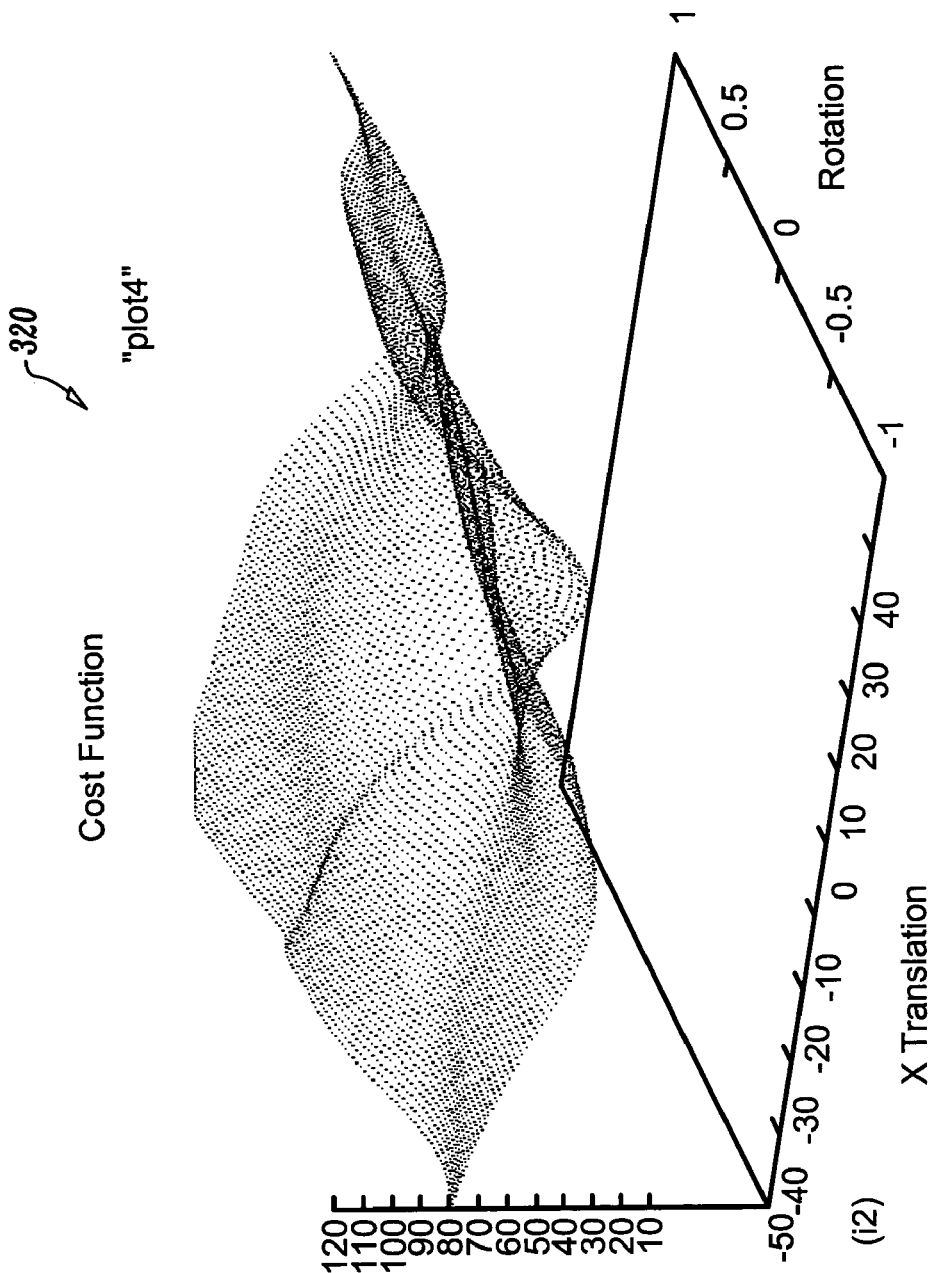
Figure 3C:
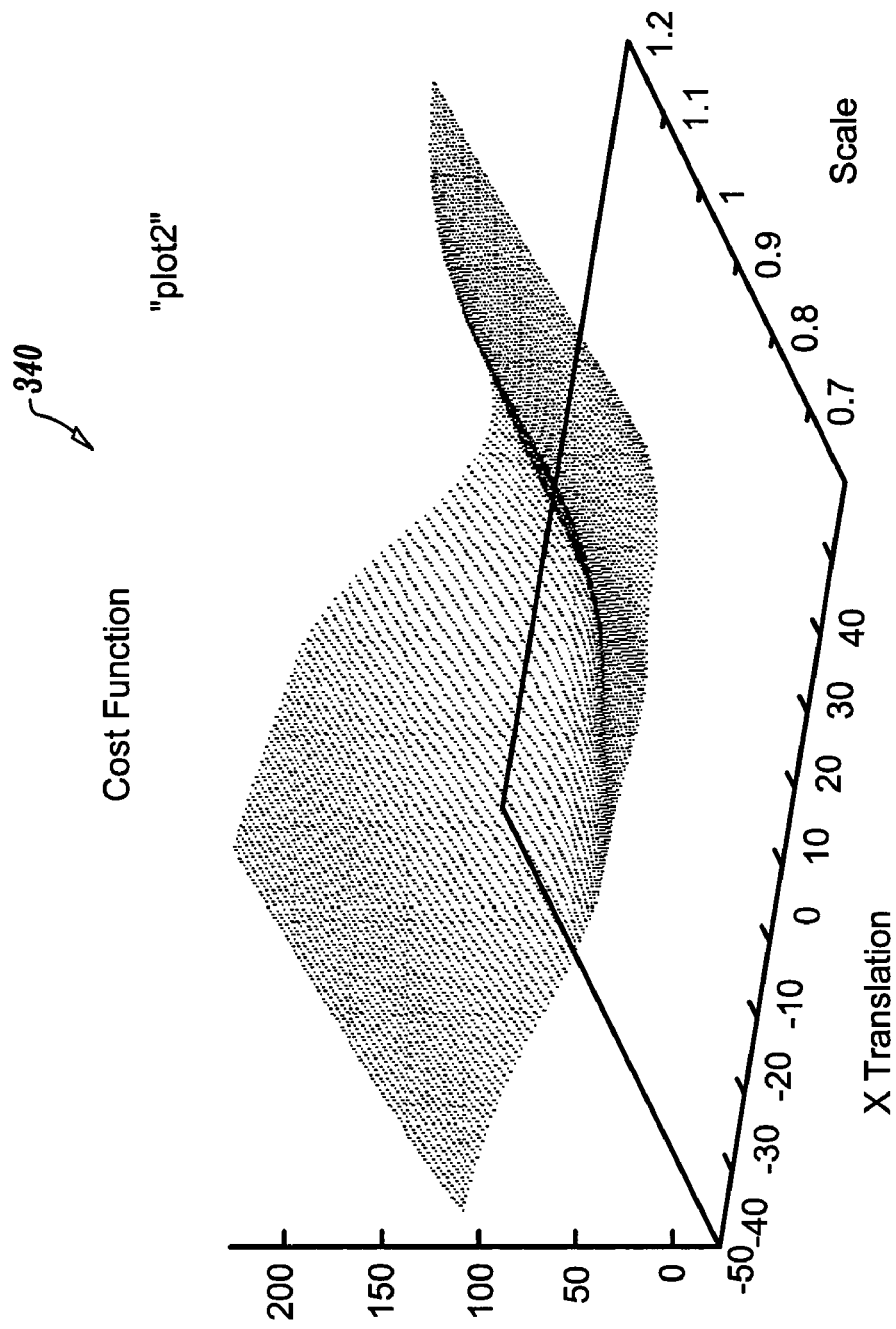
Figure 3D:
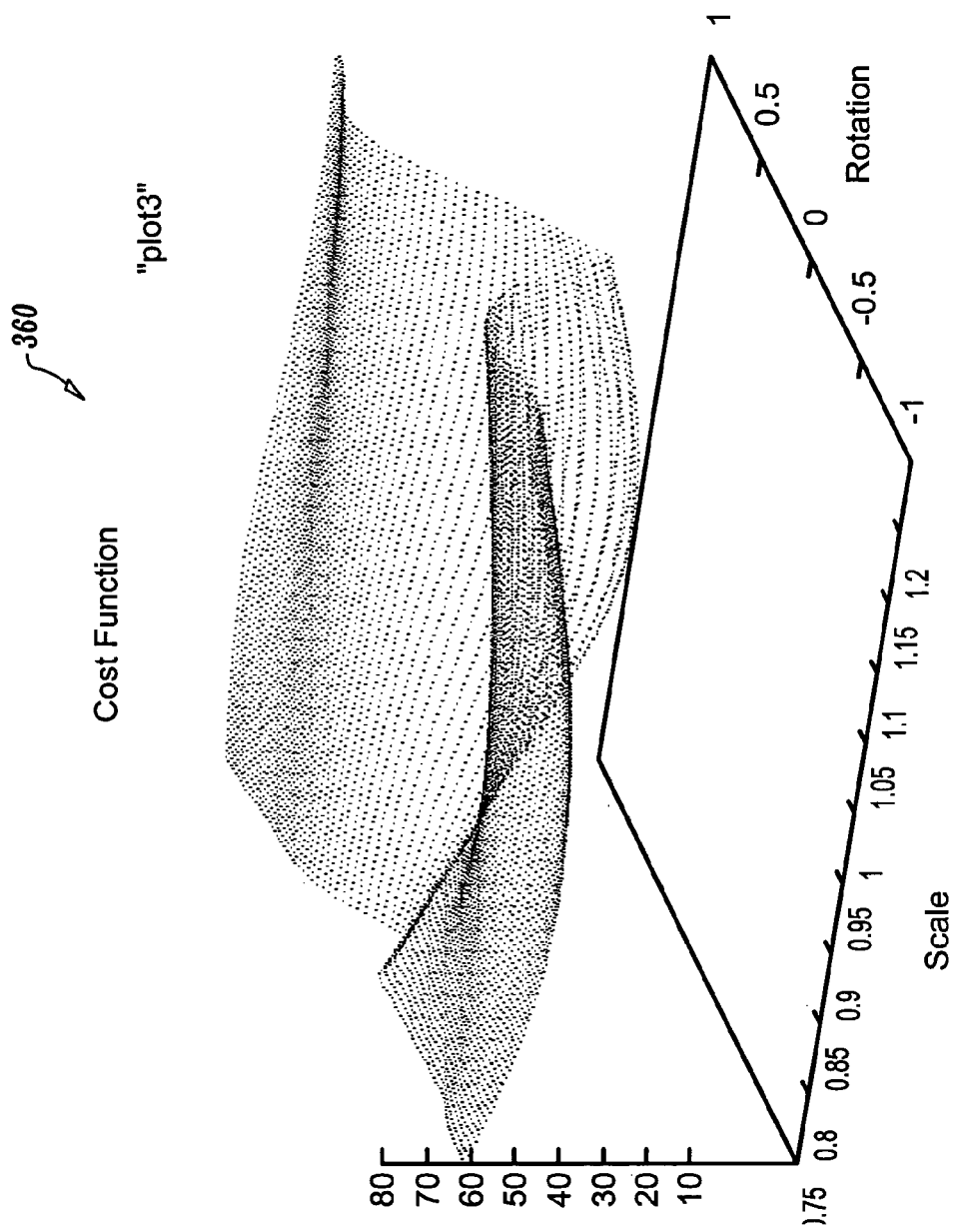

Turning now to FIG. 3, performances of the disclosed module under various initial conditions with empirical evaluation of the cost function are indicated generally by the reference numerals 300, 320, 340 and 360, respectively. For the cost function 300, scale and rotation are known but translation is to be recovered. For the cost function 320, translation in x and scale are known but translation in y and rotation are to be recovered. For the cost function 340, translation in x and rotation are known but translation in y and scale are to be recovered. And, for the cost function 360, translation in x and translation in y are known but rotation and scale are to be recovered.

Figure 4:
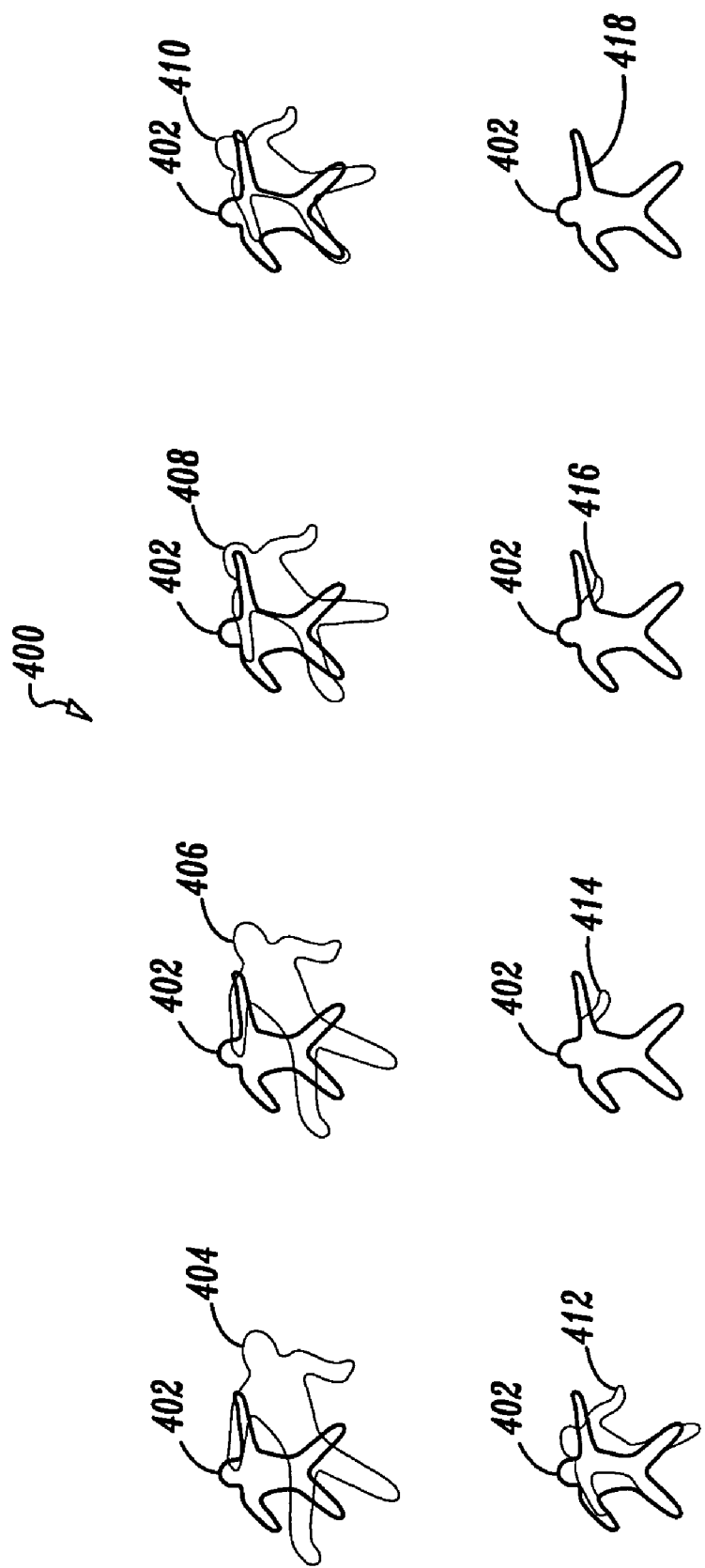
FIG. 4 shows a schematic representation of some results on the performance of an additional term for a global-to-local rigid body registration with synthetic motion and different subjects.

As shown in FIG. 4, results on the performance of an additional term for a global-to-local rigid body registration with synthetic motion and different subjects is indicated generally by the reference numeral 400. A rigid body 402 is overlaid with a first subject subject having sequential synthetic motion as indicated by 404 through 410, respectively. The rigid body 402 is overlaid with a second subject subject having sequential synthetic motion as indicated by 412 through 418, respectively.

Figure 5:
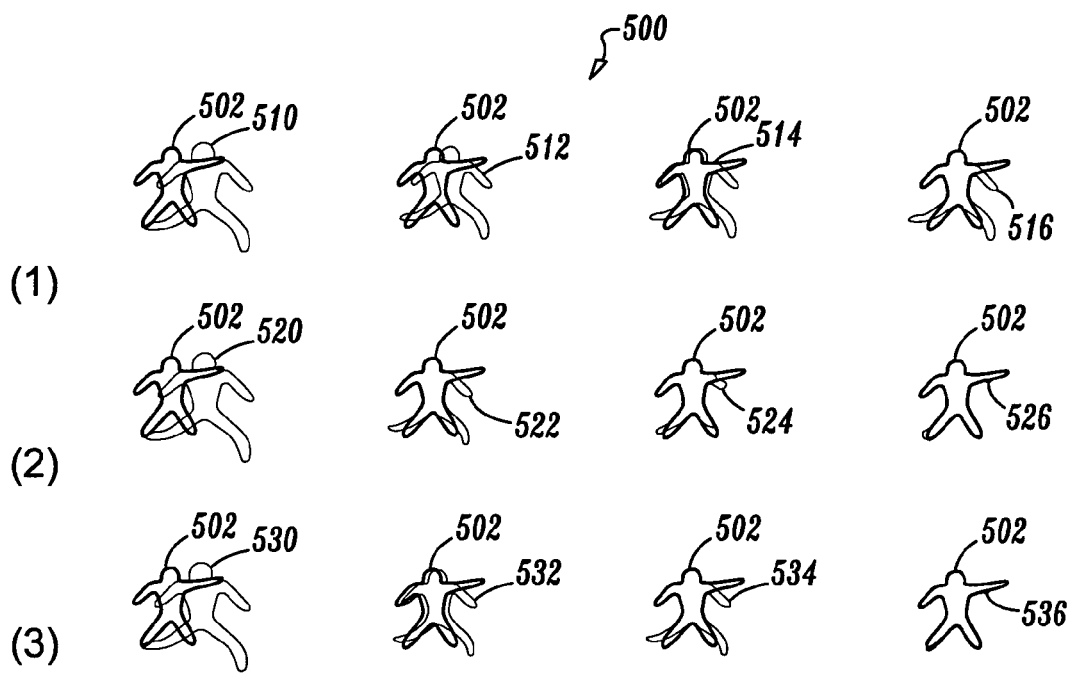
FIG. 5 shows a schematic representation of registrations for (1) global, (2) global-to-local and (3) local registration with regularization constraints.

Turning to FIG. 5, registrations for (1) global, (2) global-to-local and (3) local registration with regularization constraints are indicated generally by the reference numeral 500. Here, a rigid body 502 is overlaid in the global registration case with sequential synthetic motions 510 through 516, respectively. The rigid body 502 is overlaid in the global-to-local case with sequential synthetic motions 520 through 526, respectively. And the rigid body 502 is overlaid in the local case with sequential synthetic motions 530 through 536, respectively.

Figure 6:
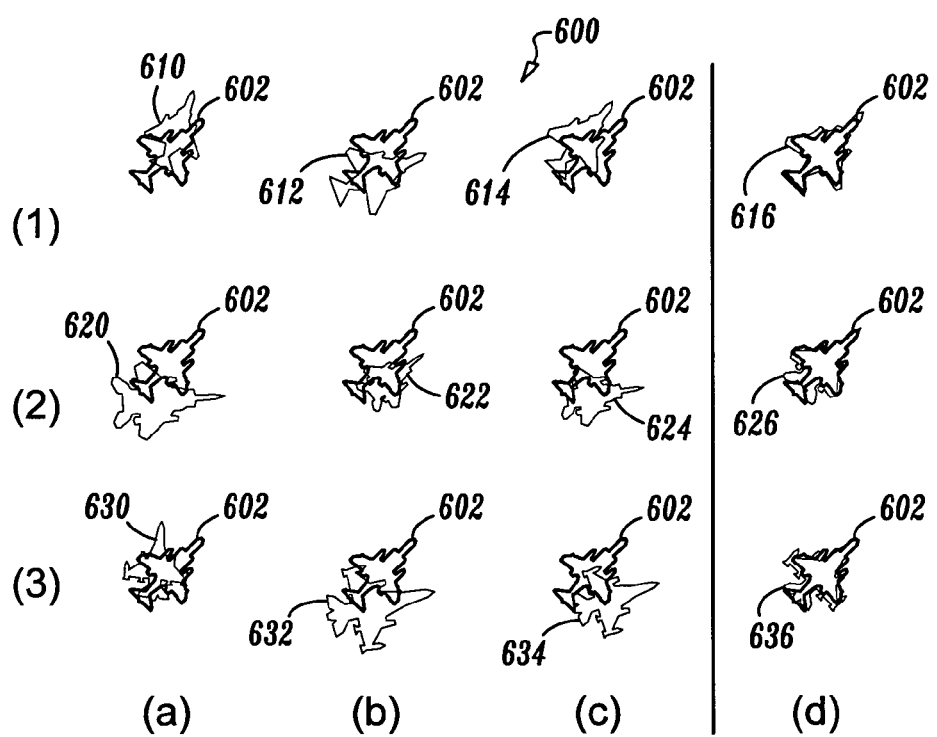
FIG. 6 shows a schematic representation of rigid registrations for rigid objects for different initial conditions.

Turning now to FIG. 6, rigid registrations for rigid objects with different initial conditions are indicated generally by the reference numeral 600. Here, a rigid body 602 is overlaid in the global registration case with sequential synthetic motions 610 through 614, respectively, with registration result 616. The rigid body 602 is overlaid in the global-to-local case with sequential synthetic motions 620 through 624, respectively, with registration result 626. And the rigid body 602 is overlaid in the local case with sequential synthetic motions 630 through 634, respectively, with registration result 636.

Figure 7:
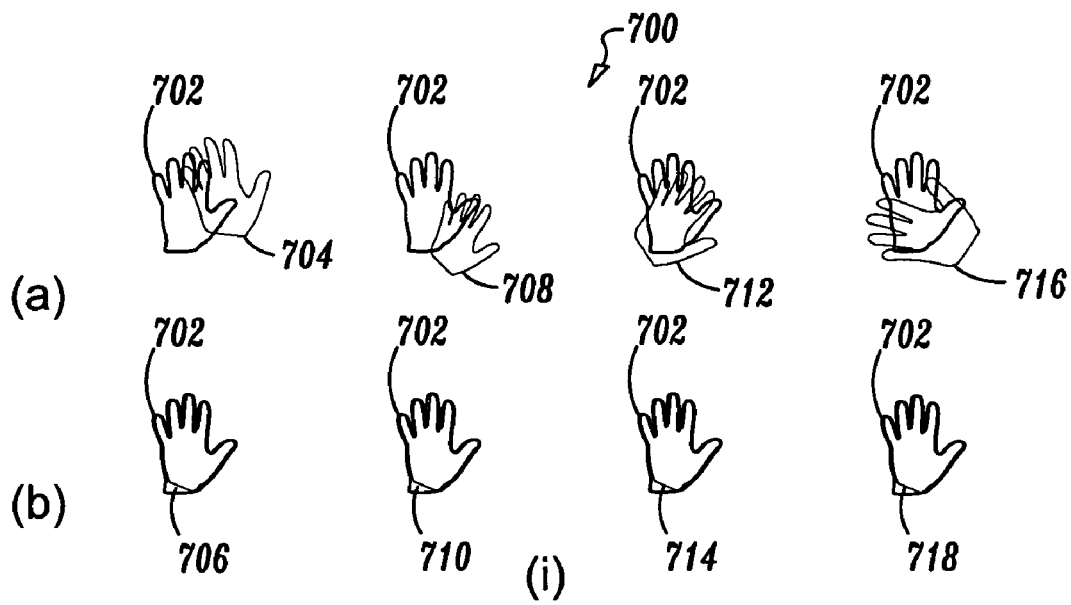
FIG. 7 shows a schematic representation of an empirical evaluation for (a) initial conditions and (b) registration results, with performance or registration ratios of 100% in each case.
Figure 7:
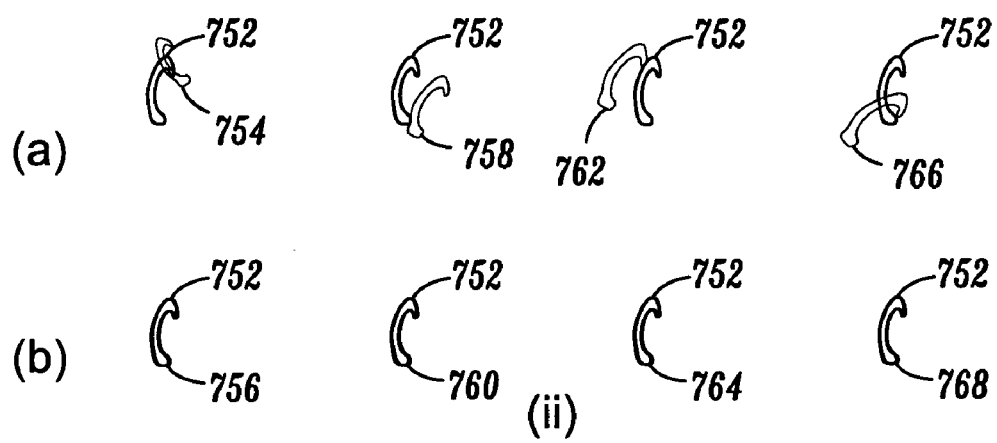

As shown in FIG. 7, an empirical evaluation for (a) initial conditions and (b) registration results, with performance or registration ratios of 100% in each case, is indicated generally by the reference numeral 700. Here, a first rigid hand 702 is overlaid with an initial condition 704 to achieve registration result 706. The rigid hand 702 is overlaid with an initial condition 708 to achieve registration result 710. The rigid hand 702 is overlaid with an initial condition 712 to achieve registration result 714, and the rigid hand 702 is overlaid with an initial condition 716 to achieve registration result 718, where each of the respective registration results exhibits a 100% ratio.

A second rigid shape 752 is overlaid with an initial condition 754 to achieve registration result 756. The rigid shape 752 is overlaid with an initial condition 758 to achieve registration result 760. The rigid shape 752 is overlaid with an initial condition 762 to achieve registration result 764, and the rigid shape 752 is overlaid with an initial condition 766 to achieve registration result 768, where each of these respective registration results also exhibits a 100% ratio.

Figure 8:
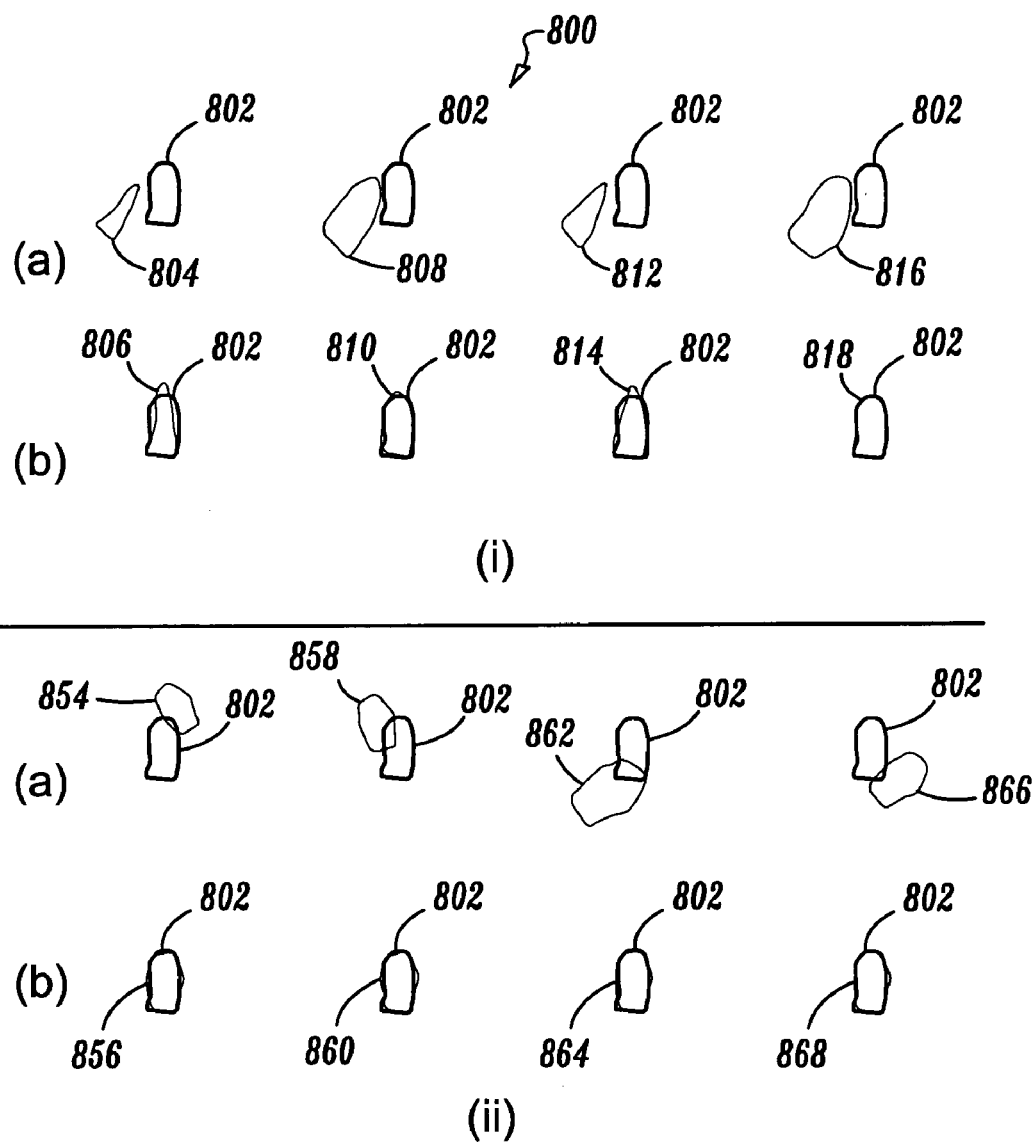
FIG. 8 shows a schematic representation of ultrasound cardiac registration for real subjects with real and synthetic motion and (a) initial conditions, (b) registration results, (i) different source shapes and (ii) emprical evaluation with a performance registration ratio of 100%.

Turning to FIG. 8, ultrasound cardiac registration for real subjects is indicated generally by the reference numeral 800, with real and synthetic motion for (a) initial conditions and (b) registration results and shown for both (i) different source shapes and (ii) emprical evaluation with performance registration ratios of 100%. Here, the rigid cardiac shape 802 is overlaid with a real initial condition 804 to achieve registration result 806. The rigid shape 802 is overlaid with a real initial condition 808 to achieve registration result 810. The rigid shape 802 is overlaid with a real initial condition 812 to achieve registration result 814, and the rigid shape 802 is overlaid with a real initial condition 816 to achieve registration result 818, where each of the respective registration results exhibits a 100% ratio.

The rigid cardiac shape 802 is overlaid with a synthetic initial condition 854 to achieve registration result 856. The rigid shape 802 is overlaid with a synthetic initial condition 858 to achieve registration result 860. The rigid shape 802 is overlaid with a synthetic initial condition 862 to achieve registration result 864, and the rigid shape 802 is overlaid with a synthetic initial condition 866 to achieve registration result 868, where each of these respective registration results also exhibits a 100% ratio.

Figure 9:
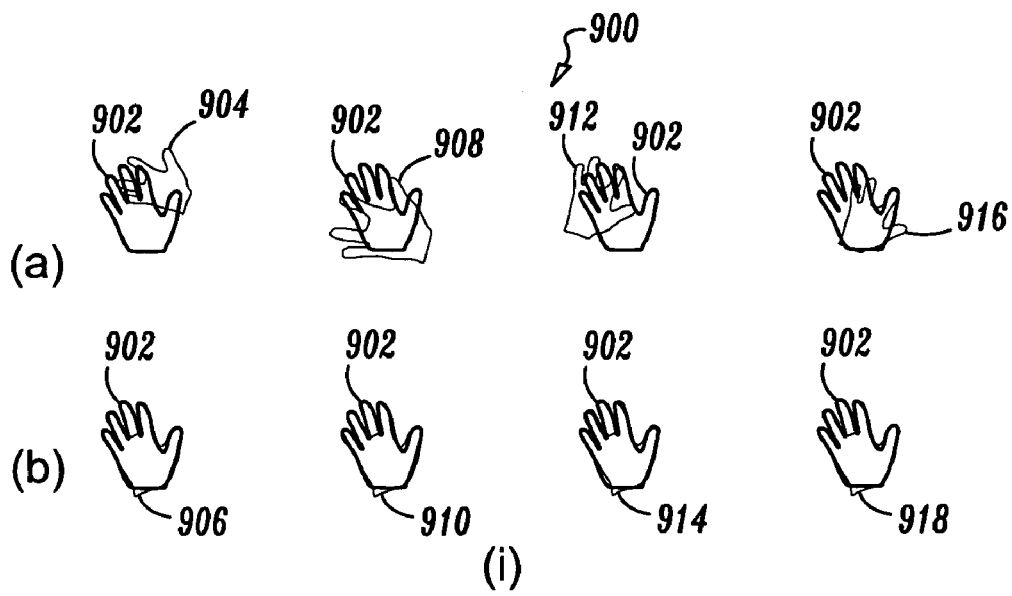
FIG. 9 shows shows a schematic representation of an empirical evaluation with (a) initial conditions, and (b) registration results for performance registration ratios of (i) 100% and (ii) 77%, respectively.
Figure 9:
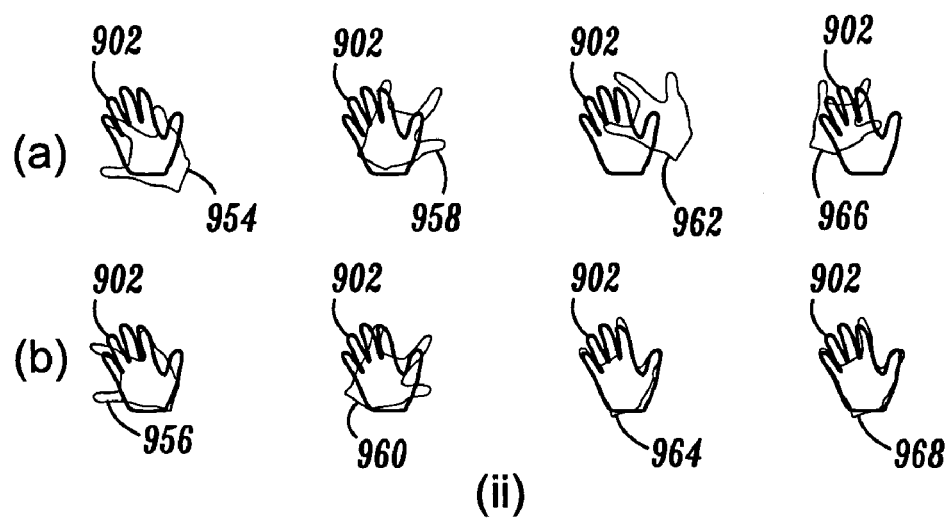

Turning now to FIG. 9, an empirical evaluation with (a) initial conditions and (b) registration results for performance registration ratios of (i) 100% and (ii) 77%, respectively, is indicated generally by the reference numeral 900. Here, a rigid hand 902 is overlaid with an initial condition 904 to achieve registration result 906. The rigid hand 902 is overlaid with an initial condition 908 to achieve registration result 910. The rigid hand 902 is overlaid with an initial condition 912 to achieve registration result 914, and the rigid hand 902 is overlaid with an initial condition 916 to achieve registration result 918, where the registration results exhibit a 100% ratio.

The rigid hand 902 is overlaid with an initial condition 954 to achieve registration result 956. The rigid hand 902 is overlaid with an initial condition 958 to achieve registration result 960. The rigid hand 902 is overlaid with an initial condition 962 to achieve registration result 964, and the rigid hand 902 is overlaid with an initial condition 966 to achieve registration result 968, where the registration results exhibit a 77% ratio.

Figure 10:
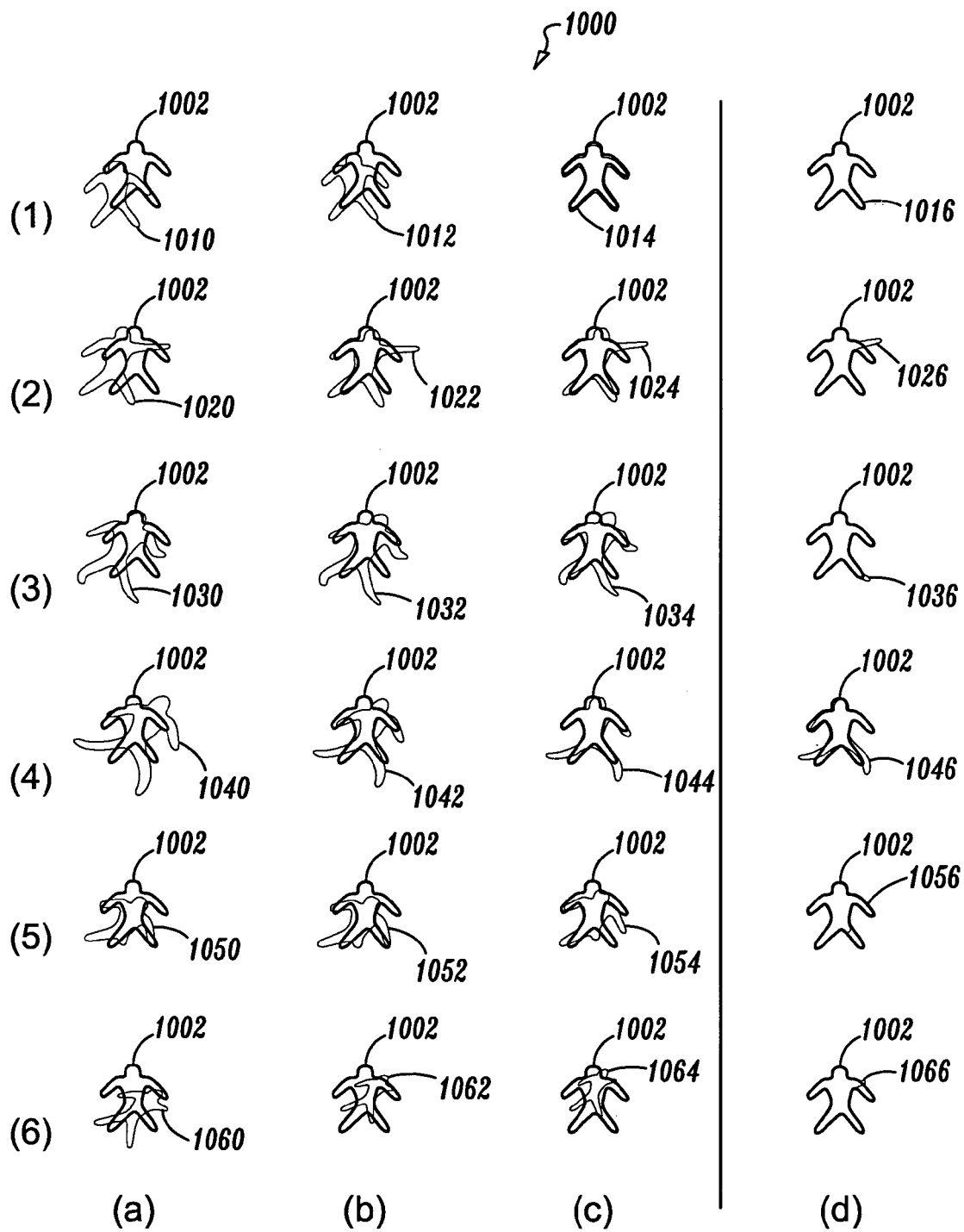
FIG. 10 shows a schematic representation of rigid registration for non-rigid objects that exhibit synthetic motion, where each row corresponds to a different case with (a) initial conditions, (b and c) intermediate results, and (d) registration results.

As shown in FIG. 10, rigid registration for non-rigid objects that exhibit synthetic motion is indicated generally by the reference numeral 1000, where each row corresponds to a different case with (a) initial conditions, (b and c) intermediate results, and (d) registration results. Here, a rigid body 1002 is overlaid in a first registration case with initial condition 1010, sequential synthetic motion intermediate results 1012 and 1014 are obtained, with registration result 1016. The rigid body 1002 is overlaid in a second registration case with initial condition 1020, sequential synthetic motion intermediate results 1022 and 1024 are obtained, with registration result 1026. The rigid body 1002 is overlaid in a third registration case with initial condition 1030, sequential synthetic motion intermediate results 1032 and 1034 are obtained, with registration result 1036. The rigid body 1002 is overlaid in a fourth registration case with initial condition 1040, sequential synthetic motion intermediate results 1042 and 1044 are obtained, with registration result 1046. The rigid body 1002 is overlaid in a fifth registration case with initial condition 1050, sequential synthetic motion intermediate results 1052 and 1054 are obtained, with registration result 1056, and the rigid body 1002 is overlaid in a sixth registration case with initial condition 1060, sequential synthetic motion intermediate results 1062 and 1064 are obtained, with registration result 1066.

Figure 11:
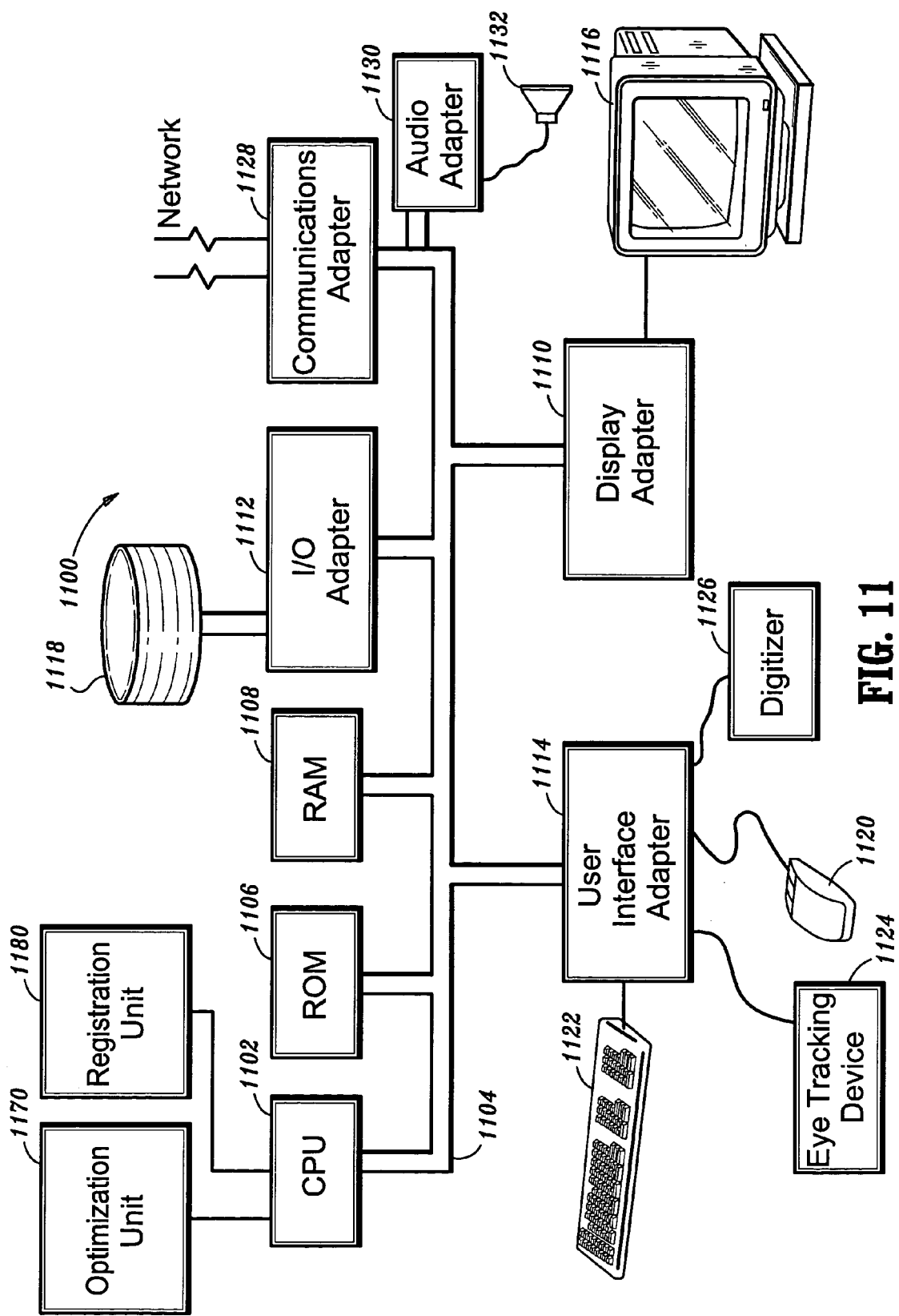
FIG. 11 shows a block diagram of a system for non-rigid image registration using distance functions according to an illustrative embodiment of the present disclosure.

FIG. 11 shows a block diagram of a system 1100 for non-rigid image registration using distance functions according to an illustrative embodiment of the present disclosure. The system 1100 includes at least one processor or central processing unit ("CPU") 1102 in signal communication with a system bus 1104. A read only memory ("ROM") 1106, a random access memory ("RAM") 1108, a display adapter 1110, an I/O adapter 1112, a user interface adapter 1114, a communications adapter 1128, and a video adapter 1130 are also in signal communication with the system bus 1104.

A display unit 1116 is in signal communication with the system bus 1104 via the display adapter 1110. A disk storage unit 1118, such as, for example, a magnetic or optical disk storage unit, is in signal communication with the system bus 104 via the I/O adapter 1112. A mouse 1120, a keyboard 1122, and an eye tracking device 1124 are in signal communication with the system bus 1104 via the user interface adapter 1114. A video imaging device or camera 1132 is in signal communication with the system bus 1104 via the video adapter 1130.

An optimization unit 1170 and a registration unit 1180 are also included in the system 1100 and in signal communication with the CPU 1102 and the system bus 1104. While the optimization unit 1170 and the registration unit 1180 are illustrated as coupled to the at least one processor or CPU 1102, these components are preferably embodied in computer program code stored in at least one of the memories 1106, 1108 and 1118, wherein the computer program code is executed by the CPU 1102.

As will be recognized by those of ordinary skill in the pertinent art based on the teachings herein, alternate embodiments are possible, such as, for example, embodying some or all of the computer program code in registers located on the processor chip 1102. Given the teachings of the disclosure provided herein, those of ordinary skill in the pertinent art will contemplate various alternate configurations and implementations of the optimization unit 1170 and the registration unit 1180, as well as the other elements of the system 1100, while practicing within the scope and spirit of the present disclosure.

1.1 Motion Model and Registration Domain

Rigid transformations refer to translation, rotation and scale. They refer to a compromise between low complexity and acceptable matching between the different structures. Their inability to deal with non-rigid shapes underlying local deformations is a considerable limitation. The affine transformation can account for a larger family of deformations. Such selection is very popular in object tracking and assumes that the moving objects or shapes are planar. Image and shape registration are two other areas where affine models were considered with encouraging performance for images/shapes that exhibit shearing. The use of projective geometry was also considered to match shapes. This methodology can account for perspective projections and rigid displacements jointly, and is suitable for shapes that appear "tilted". Curved or elastic registration methods go beyond the assumption of planar objects and can better account for local deformations.

Deformable templates are common tools in image segmentation and registration. The shape to be recovered is parameterized using a set of basic functions and a set of control points. Segmentation and/or registration is obtained through an elastic method that best fits the model to the image characteristics or to the target shape. The selection of the registration model is also related to the transformation domain. Global motion models are assumed to be valid for the entire region or image to be registered.

Local deformations refer to pixel-wise registration components. Local registration domains are suitable for objects that undergo local deformations. Correspondences are obtained through an image volume defined registration flow that varies across pixels. Dependencies across small neighborhoods are introduced to ensure the regularity of the registration map and to solve the ill-posed inference problem. These methods exhibit strong sensitivity to noise and fail to deal with large motions unless properly initialized. Their ability to deal with non-rigid motion makes them quite attractive. Unlike the local registration methods, global transformations are valid for the entire shape. Correspondences between the target D and the source S are obtained by applying the same parametric transformation. Robustness is a key characteristic of these methods.

The estimation of the registration parameters can be done reliably due to the significant number of region pixels available for measurements for solving the inference problem. On the other hand, such methods perform poorly if the assumptions related to the registration problem from the form of the transformation are not satisfied, such as for non-rigid motion. Neither the selection of the transformation nor the domain is sufficient for determining the registration map. These two components have to be integrated in an optimization framework by means of selecting a dissimilarity measure, which involves the source and the target shapes, the motion model and the registration domain.

1.2 Optimization Procedure

An optimization procedure includes the selection of a mathematical framework by finding an optimum of some functional defined on the parameter space, which is a key component of the registration procedure. These functionals attempt to quantify the similarity or the dissimilarity between two shapes. Variational frameworks, stochastic principles, and graph-driven techniques are mathematical spaces that were considered. The optimization procedure is strongly related to the mathematical framework. Thus, the use of gradient-descent methods is a common selection in variational settings. Geometric hashing may be used, as well as deterministic relaxation algorithms like the iterative closest point, iterative conditional modes, and the like. One can also consider the feature space to perform additional grouping of the shape registration methods. The use of gray level features, global histograms, image curvature and the like can lead to promising results. In particular, medial axes/skeletons, shocks, local curvature, and the like, have outperformed in shape registration.

In the present disclosure, a variational framework is defined for rigid and non-rigid shape alignment. The use of 2D structures is considered for the validation of the method that can be extended to any arbitrary dimension. The present approach includes two contributions: (i) the selection of a powerful feature space, and (ii) the integration of global linear registration models (e.g., rigid, affine, and the like) and local deformations. The structures of interest (i.e., 2D shapes) are considered in a higher dimension as surfaces and represented using signed Euclidean distance transforms. Such selection creates an augmented registration space that consists of shape clones coherently positioned in the image plane. Registration is then equivalent to seeking mutual correspondences between the source, the target shape and their clones.

A variational framework that integrates global motion with local deformations is used for the estimation of the registration parameters. This framework is defined at the distance transform space and aims at finding the best transformation between the distance-driven representations of the source and the target. The sum of squared differences between these representations is considered as optimization criterion to demonstrate the potentials of the method.

To deal with more complex cases that involve shapes with uncertainties, a more elaborate technique including registration and prior learning is also presented. The objective function considers a linear parametric model and a pixel-wise deformation field resulting in a non-rigid registration paradigm. Both registration components are recovered simultaneously through a gradient-descent method.

The presently disclosed method performs global-to-local registration where local deformations are used to overcome the limitations of the global linear model. Encouraging experimental results using 2D shapes were obtained. Distance transforms and level set representations were considered for image registration/segmentation in the past either as features or as an optimization space. In one method, the Euclidean distance is considered to be the feature space. Then 2D/3D objects are to be registered using linear (e.g., rigid, affine) transformations to a prior shape model. This model refers to a collection of points that can be obtained through uniform sampling.

Distance maps from edges were also considered for image alignment. These methods focus on global transformations and cannot deal with local deformations and important scale variations. Level set representations can be related with the presently disclosed method when distance maps are used as embedding functions. For example, a local registration may be recovered by seeking pixel-wise the lowest cost geodesic path between the source and the target. A different approach was considered where registration is recovered through a curve evolution approach. Distance transforms were also considered for accelerating the optimization procedure. For example, in one method, the key contribution is a motion model defining a parameterized volume transformation with variable resolution by increasing in the proximity of the shape.

Section 2 introduces a shape representation based on distance transforms and shows that such selection is invariant to translation and rotation. Global registration using the sum of square differences ("SSD") criterion is considered in Section 3 while local deformations are introduced in section 4. Supervised learning and non-rigid registration are presented in Section 5. Conclusions and discussion appear in Section 6.

2. Shape Representation

A crucial component in the procedure of registering arbitrary shapes is the underlying shape representation, since it can significantly affect the performance of the selected registration algorithm. The use of point-based make models, deformable models and templates, active shapes, Fourier descriptors, medial axis, and level set representations are some alternatives to represent shapes as well as their variations. Although these representations are powerful enough to capture a certain number of local deformations, they require a large number of parameters to deal with important shape deformations. Also, their extension to describe structures of higher dimension than curves and surfaces is not trivial.

Thus, for obtaining a global-to-local registration, the use of Euclidean distance maps is considered to represent shapes. Such selection can deal with local deformations and is invariant to translation and rotation. In order to facilitate the introduction of the method, we consider the 2D case and choose a Lipschitz function that refers to a distance transform representation for a given shape S. By definition, the domain is bounded since it refers to the image domain. The shape defines a bi-modal partition with a convex hull and background. Given these definitions the following representation is considered:

$$\Phi_S(x, y) = \begin{cases} 0, & (x, y) \in S \\ +ED((x, y), S) > 0, & (x, y) \in R_S \\ -ED((x, y), S) < 0, & (x, y) \in [\Omega - R_S] \end{cases} \quad (1)$$

where $ED((x,y),S)$ refers to the minimum Euclidean distance between the grid location $(x,y)$ and the shape S. This is a level set representation of S. The fast marching algorithm or other techniques can be used for the construction of these representations. Distance transforms can provide a convenient feature space when the corresponding objective function is optimized using a gradient descent method. One can show that the gradient is a limit vector in the direction of the vector distance function. Sufficient conditions for convergence of gradient descent methods require continuous first derivatives. The considered representation satisfies these conditions in several ways. Furthermore, it can be easily proven that this representation is invariant to translation and rotation. Let us consider a shape V that is obtained after rotating S by an angle and translating by a vector:

$$A(x, y) = \begin{pmatrix} \hat{x} \\ \hat{y} \end{pmatrix} = s\begin{pmatrix} \cos\theta & \sin\theta \\ -\sin\theta & \cos\theta \end{pmatrix}\begin{pmatrix} x \\ y \end{pmatrix} + \begin{pmatrix} T_x \\ T_y \end{pmatrix} \quad (2)$$

Then, if we consider a pixel (x, y) with distance d from the interface D, the following relation holds:

$$d = ED((x,y),D) = \min_{(u,v)\in D}\{\sqrt{(u-x)^2 + (v-y)^2}\} \quad (3)$$

The use of the inverse transformation between D and S for (1, y) leads to the following equation:

$$\begin{pmatrix} \hat{x} \\ y \end{pmatrix} = \begin{pmatrix} x\cos(-\theta) + y\sin(-\theta) - T_x \\ -x\sin(-\theta) + y\cos(-\theta) - T_T \end{pmatrix} \quad (4)$$

$$s = \left\{ \begin{pmatrix} \hat{u} \\ \hat{v} \end{pmatrix} = \begin{pmatrix} u\cos(-\theta) + v\sin(-\theta) - T_x \\ -u\sin(-\theta) + v\cos(-\theta) - T_Y \end{pmatrix} : (u, v) \in D \right\}$$

Thus, the distance between the vector $$\begin{pmatrix} \hat{x} \\ y \end{pmatrix}$$

and the interface S is given by:

$$ED((\hat{x}, \hat{y}), S) = \min_{(\hat{u},\hat{v})\in S}\left\{\sqrt{(\hat{u}-\hat{x})^2 + (\hat{v}-\hat{y})^2}\right\} \quad (5)$$

$$= \min_{(u,v)\in D}\left\{\begin{array}{c}((u-x)\cos(-\theta) + (v-y)\sin(-\theta))^2 \\ (-(u-x)\sin(-\theta) + (v-y)\cos(-\theta))^2\end{array}\right\}$$

$$= \min_{(u,v)\in D}\left\{\sqrt{(u-x)^2 + (v-y)^2}\right\} = D((x, y), D)$$

We have shown that the selected representation is invariant to rotation and translation. On the other hand when the transformation exhibits a scale component then the selected shape representations are not invariant. One can easily show that the following relation holds between the level set representations of S and V under a scale transformation:

$$s\ ED((x,y),D) = ED((\hat{x},\hat{y}),S) \Rightarrow s\Phi_D(x,y) = \Phi_S(\hat{x},\hat{y}) \quad (6)$$

The interpretation of this condition follows. If correspondences are known between the source and the target, then the corresponding distances are proportional to the scale factor.

3. Global Registration

Registration is equivalent to finding a point-wise transformation between the current V and the target shape S that minimizes a given dissimilarity measure. Distance transform representations refer to a higher dimension space than the original (e.g., 2D shapes) and increase the problem/solution potentials. One can seek a transformation A that creates pixel-wise intensity correspondences between the source and the target shape representation. We have shown that distance transforms representations are invariant to translation and rotation while we are able to predict the effect of scale variations. These conditions can lead to the following constraint:

$$\begin{cases} (s, \theta, T) \\ A(x, y) = \begin{pmatrix} A_x \\ A_Y \end{pmatrix} = s\begin{pmatrix} \cos\theta & \sin\theta \\ -\sin\theta & \cos\theta \end{pmatrix}\begin{pmatrix} x \\ y \end{pmatrix} + \begin{pmatrix} T_x \\ T_y \end{pmatrix} \\ \forall (x, y) \in \Omega : [s\Phi_D(x, y) = \Phi_S(A(x, y))] \end{cases} \quad (7)$$

Exploiting this constraint, we consider registration in a global optimization framework that involves all pixels in the image plane. The sum of squared differences, the optimization of the correlation ratio, the maximization of the mutual information, and the like can be used as a similarity measure between the source and the target representations. In order to introduce and demonstrate the potentials of the selected shape representation and the presently disclosed method, we consider a simple well known and widely used criterion; the sum of square differences ("SSD"). Thus, we assume a global rigid deformation between S and D that involves three parameters [A=(s, θ, T)]; a rotation angle θ, a translation vector T=(Tx, Ty) and a scale factor s.

As described for FIG. 1, an exemplary Rigid Hand Registration with Synthetic Motion has the parameters: {s=1.27, θ=71.38°, Tx=−19.65, Ty=21.32}. Thus, the following objective function can be used to recover the optimal registration parameters:

$$E(s, \theta, T) = \int\int_\Omega (s\Phi_D(x, y) - \Phi_S(A(x, y)))^2 d\Omega \quad (8)$$

The initial positions of the source S and the target V can produce distance map representations that are not equally defined in a fixed image plane. To deal with this technical limitation as well to decrease computational complexity we consider the areas defined by two equal-distance contours (inwards, outwards) from the input shapes:

$$E(s, \theta, T) = \quad (9)$$

$$\int\int_\Omega N_\delta(\Phi_D(x, y), \Phi_S(A(x, y)))(s\Phi_D(x, y) - \Phi_S(A(x, y)))^2 d\Omega$$

where $N_\delta$ is a binary function given by $$N_\delta(\theta_1, \theta_2) = \begin{cases} 0, & \min(|\theta_1|, |\theta_2|) > \delta \\ 1, & \min(|\theta_1|, |\theta_2|) <= \delta \end{cases}$$

where the binary function N has the following interpretation: pixels (isophotes), within a range of distance less than delta from the shapes to be registered are considered in the optimization process. Using the disclosed formulation we were able to convert a geometry driven point-correspondence problem into an image-registration application where space as well as feature-based intensity correspondences are considered.

Returning to FIG. 2, (1) a Rigid Body Registration with synthetic motion and different subjects has the parameters: {s=0.63, θ=59.94°, Tx=−13.97, Ty=−14.09}, and (2) a Rigid Body Registration with Real Motion are shown. A gradient descent method can be used to recover the optimal registration parameters:

$$\begin{cases} \frac{d}{dt}T_x = 2\int\int_\Omega N_\delta(\Phi_D, \Phi_S)\frac{\partial\Phi_S}{\partial x}(S\Phi_D - \Phi_S(A)) & (10) \\ \frac{d}{dt}T_x = 2\int\int_\Omega N_\delta(\Phi_D, \Phi_S)\frac{\partial\Phi_S}{\partial y}(S\Phi_D - \Phi_S(A)) \\ \frac{d}{dt}\theta = 2\int\int_\Omega (\Phi_D, \Phi_S)(\nabla\Phi_S \cdot \nabla_\theta A)(S\Phi_D - \Phi_S(A)) \\ \quad = 2\int\int_\Omega N_\delta(\Phi_D, \Phi_S)S\left(\frac{\partial\Phi_S}{\partial x}, \frac{\partial\Phi_S}{\partial y}\right) \cdot \\ \quad \begin{pmatrix} -x\sin\theta + y\cos\theta \\ -x\cos\theta - y\sin\theta \end{pmatrix}(S\Phi_D - \Phi_S(A)) \\ \frac{d}{dt}S = 2\int\int_\Omega N_\delta(\Phi_D, \Phi_S)(\Phi_D + \nabla\Phi_S \cdot \nabla_S A)(S\Phi_D - \Phi_S(A)) \\ \quad = 2\int\int_\Omega N_\delta(\Phi_D, \Phi_S)\left(\Phi_D + \left(\frac{\partial\Phi_S}{\partial x}, \frac{\partial\Phi_S}{\partial y}\right) \cdot \\ \quad \begin{pmatrix} x\cos\theta + y\sin\theta \\ -x\sin\theta + y\cos\theta \end{pmatrix}\right)(s\Phi_D - \Phi_S(A)) \end{cases}$$

Returning now to FIG. 3, the performance of the disclosed module under various initial conditions is shown with empirical evaluation of the cost function.

Given the rigid-invariant registration criteria, one can claim that the method is suitable for rigid objects. The use of robust estimators can be considered to deal with objects that undergo local deformations. To this end, a dominant rigid registration component is assumed. It can be efficiently recovered because of the small number of outliers due to the use of distance maps that downgrade the importance of local deformations. The experimental results demonstrate promising potentials of the disclosed framework. However, a deeper empirical validation is required. The form of the cost function is a good indicator regarding the efficiency and/or stability of the framework. Non-convex optimization criteria like the one considered herein may suffer from the initial conditions. In the presently disclosed approach, we have considered a very strong feature space, the signed distance transforms, and therefore one would expect that the performance of the method would be satisfactory. In order to perform a study on this performance, we can constrain the unknown parameter space in two dimensions.

We have considered the examples shown in FIG. 1. Then, from the 4-dimensional parameter space we have studied the following cases from FIG. 3: Scale and rotation are known, translation is to be recovered [FIG. (3.(i.1))]. Translation in x and scale are known, translation in y and rotation are to be recovered [FIG. (3.(i.2))]. Translation in x and rotation are known, translation in y and scale are to be recovered [FIG. (3.(ii.1))]. Translation in x and translation in y are known, rotation and scale are to be recovered [FIG. (3.(ii.2))].

An empirical evaluation test is considered where we have quantized the search space using uniform sampling rule (100 elements) for all unknown parameters in each case. Translation in (x, y) was in the range of [−50, 50]×[−50,50], scale in [0.75, 1.25] and rotation in [−π, π]. Then, one can estimate the cost function in the space of two unknown parameters, by considering all possible combinations derived from the sampling strategy, where the other two parameters are fixed. The resulting functional as shown in FIG. 3 has good properties; it is smooth and exhibits a single global minimum.

The cost function of FIG. 3 has a convex form for all combinations that involve two unknown registration variables. This limited validation cannot be used to show convexity of objective function when the registration problem is considered in its full dimensionality, such as four variables of rigid transformation. However, the form of this function in a reduced variable space is a good indicator for a well-behaved optimization criterion with smooth properties. Rigid-based registration can be an acceptable solution to a large number of image processing and computer vision applications.

Medical imaging is an area where non-rigid motion is a common problem. The ability of creating pixel-wise correspondences between physiological structures either for comparison purposes, or for clinical studies is an important priority in the medical imaging community.

4. Global-to-Local Registration

Local deformations are desirable registration components. Many objects undergo rigid and non-rigid motion simultaneously. Due to the lack of information the complete recovery of the local deformation field is an ill-posed problem. The use of regularization terms is a common practice to overcome this limitation. However, proper initial conditions are a strong requirement to convergence for these methods. Dealing with large-scale motion is also a limitation of pixel-wise registration techniques. The framework disclosed up to now can account for global linear transformations leading to promising results. The proper handling of non-rigid objects (e.g., shapes) and local deformations is still an issue. Such challenge can be met by incorporating into the method the notion of local deformations.

One can assume that the observed shape to be registered is a rigid/affine or similar transformation A of the target plus some local deformations (U, V) for non-rigid object parts:

(s,θ,T)

(U(x,y),V(x,y)):(x,y)∈Ω

$$\forall (x,y)\in\Omega:[S\Phi_D(x,y)=\Phi_S(A+(U,V))] \quad (11)$$

The local deformation field (u(x,y),v(x,y)) is defined in the image plane and has values only for the non-rigid parts of the shape to be registered. This hypothesis can lead to a two-fold registration criterion that involves a global motion model and a local deformation field:

$$E(s, \theta, T, (U, V)) = \alpha \underbrace{\int\int_\Omega N_\delta(\Phi_D, \Phi_S)(S\Phi_D - \Phi_S(A))^2 d\Omega}_{\text{Global Model-based Registration}} + \quad (12)$$

$$(1-\alpha)\underbrace{\int\int_\Omega N_\delta(\Phi_D, \Phi_S)(S\Phi_D - \Phi_S(A+(U,V)))^2 d\Omega}_{\text{Pixel-wise Local Deformations/Corrections}}$$

where this includes a constant for balancing the contributions of the two terms (i.e., global motion and local deformations). The interpretation of this criterion follows. Registration errors caused by the use of the rigid transformation are corrected using the local deformation field. The form of this criterion to guarantees (modulo the selection of a) primary the estimation of the rigid motion parameters and then the recovery of the local deformation field.

As described for FIG. 4, some results on the performance of this additional term are indicated. The same initial conditions as the ones used for the validation of the rigid registration component of FIG. 2a are considered. One can see the local corrections due to the pixel-wise deformation field on the bottom left (right foot) and on the top-right part of the object (left hand). Local deformations increase significantly the complexity of the method. A simple way to decrease this complexity is to constrain the search space. The local deformation field is to be computed only in the vicinity of the source shape. The disclosed framework estimates the global motion model as well as the local deformation field in an augmented shape driven space, where correspondence is established for the original shapes as well as their clones. The use of this space improves performance of the registration process.

At the same time, the role of the local registration field is to deal with local deformations and non-rigid parts. One can assume that the registration solution provided by the rigid motion is close to the optimal solution. Therefore, local deformations are to be computed in a small band defined in the vicinity of the shape. To this end, we can modify the disclosed cost function as follows:

$$E(s, \theta, T, (U, V)) = \alpha \int\int_\Omega \underbrace{N_{\delta_1}(\Phi_D, \Phi_S)(S\Phi_D - \Phi_S(A))^2 d\Omega}_{GlobalModel\text{-}based\ registration} + \quad (13)$$

$$(1 - \alpha) \int\int_\Omega \underbrace{N_{\delta_2}(\Phi_D, \Phi_S)(S\Phi_D - \Phi_S(A + (U, V)))^2 d\Omega}_{Pixel\text{-}wiseLocalDeformationsl\ Corrections}$$

Such modification of the objective function decreases significantly the computational requirements of the method without altering the performance. Spatial derivatives can be computed once at the beginning of the process to further increase the convergence rate.

4.1. Smoothness Constraints

Real objects undergoing shape transformations refer to some physical entities. The components of these entities are connected elements and have to exhibit similar transformations.

the parameters $\{s=0.63, \theta=59.94°, Tx=-13.97, Ty=-14.09\}$. Smoothness of the pixel-wise motion field is a natural registration assumption. Local deformations cannot be independent in the pixel level and therefore this condition has to be imposed during the recovery of the local deformation field.

The use of penalty terms to introduce this condition is a common technique when solving the inference problem. Terms that account for smoothness on the field (u, v) can be considered in various forms. We adopt the simplest form of this constraint, although complex and more efficient terms can be found in the literature and can also be considered:

$$E(s, \theta, T, (U, V)) = \alpha \int\int_\Omega \underbrace{N_{\delta_1}(\Phi_D, \Phi_S)(S\Phi_D - \Phi_S(A))^2 d\Omega}_{GlobalTranformation} + \quad (14)$$

$$(1 - \alpha)\beta \int\int_\Omega \underbrace{N_{\delta_2}(\Phi_D, \Phi_S)(S\Phi_D - \Phi_S(A + (U, V)))^2 d\Omega}_{LocalDeformations} +$$

$$(1 - \alpha)(1 - \beta) \int\int_\Omega \underbrace{N_{\delta_2}(\Phi_D, \Phi_S)(U_x^2 + U_y^2 + V_x^2 + V_y^2) d\Omega}_{LocalDeformationsSmoothness}$$

Local Deformations and Smoothness are shown, where $(U_x, U_y, V_x, V_y)$ are the spatial derivatives of the local deformation field and delta is a constant that balances the trend between the quality of local correspondences and smoothness of the deformation field. The objective function was gradually constructed and therefore its interpretation is evident. The first term aims at finding pixel-wise intensity such as for a level set representation, and correspondences according to a global motion model such as for a rigid transformation. The second term aims at correcting the correspondences in the pixel level using a local deformation field on top of the existing global model, while the third term constrains these deformations to be locally smooth. Using a gradient descent method, we can recover the following partial differential equations for the estimation of registration parameters:

$$\begin{cases} \frac{d}{dt}T = 2\int\int_\Omega \left(\nabla\Phi_S \cdot \begin{pmatrix} \nabla_{T_x} A \\ \nabla_{T_y} A \end{pmatrix}\right) \\ \qquad [N_{\delta_1}(\Phi_D, \Phi_S)\alpha(S\Phi_D - \Phi_S(A)) + N_{\delta_2}(\Phi_D, \Phi_S)\beta(1-\alpha)(S\Phi_D - \Phi_S(A + (U, V)))] \\ \frac{d}{dt}\theta = 2\int\int_\Omega (\nabla\Phi_S \cdot \nabla_\theta A) \\ \qquad [N_{\delta_1}(\Phi_D, \Phi_S)\alpha(S\Phi_D - \Phi_S(A)) + N_{\delta_2}(\Phi_D, \Phi_S)\beta(1-\alpha)(S\Phi_D - \Phi_S(A + (U, V)))] \\ \frac{d}{dt}s = 2\int\int_\Omega (\Phi_D + \nabla\Phi_S \cdot \nabla_S A) \\ \qquad [N_{\delta_1}(\Phi_D, \Phi_S)\alpha(S\Phi_D - \Phi_S(A)) + N_{\delta_2}(\Phi_D, \Phi_S)\beta(1-\alpha)(S\Phi_D - \Phi_S(A + (U, V)))] \\ \frac{d}{dt}U = 2(1-\alpha)(1-\beta)(U_{xx} + U_{yy}) + \\ \qquad 2\beta(1-\alpha)\nabla_x\Phi_S(A + (U, V))(S\Phi_D - \Phi_S(A + (U, V))) \\ \frac{d}{dt}V = 2(1-\alpha)(1-\beta)(V_{xx} + V_{yy}) + \\ \qquad 2\beta(1-\alpha)\nabla_x\Phi_S(A + (U, V))(S\Phi_D - \Phi_S(A + (U, V))) \end{cases} \quad (15)$$

As described for FIG. 4, a Global-to-Local Rigid Body Registration with synthetic motion and different subjects has The selection of the alpha parameter is a significant component of the algorithm since it controls the global-tolocal factor. Moreover, according to this parameter the construction of the local deformation field is delayed until the parameters of the global rigid model are properly estimated. An alternative to this coupling between global and local registration components is a two-stage approach that involves the estimation of the global model first, and then the local estimates of the deformation field. However, such selection can be sensitive to the initial conditions, noise and outliers. Moreover, it involves the use of time measures to control the gradient descend method and cannot be done automatically. One can claim that the disclosed framework shares the same limitation. A simple way to overcome this constraint is to penalize the formation of a rich local deformation field using its magnitude:

$$E(S, \theta, T, (U, V)) = \alpha \int\int_\Omega N_{\delta_1}(\Phi_D, \Phi_S)(S\Phi_D - \Phi_S(A))^2 d\Omega$$
$$+ (1-\alpha)\beta \int\int_\Omega N_{\delta_2}(\Phi_D, \Phi_S)(S\Phi_D - \Phi_S(A+U, V))^2 d\Omega$$
$$+ (1-\alpha)(1-\beta) \int\int_\Omega N_{\delta_2}(\Phi_D, \Phi_S)[(U_x^2 + U_y^2 + V_x^2 + V_y^2) + \gamma(U^2 + V^2)] d\Omega$$

The benefit of using such term will be the decrease of the importance of the local deformation field. At the same time such term will introduce additional complexity to the model. In order to evaluate the registration performance of the method with respect to the alpha parameter, we have conducted several experiments in a quantized alpha space. Modulo its selection, the individual estimates of the global model and the local deformation measures were different. However, their additive joint estimates or final registration remain the same leading to the same overall performance.

Returning to FIG. 5, Global, Global-to-Local and Local Registrations are shown: (1) Global {s=0.79, θ=1.34°, Tx=−16.34, Ty=−15.76}, (2) Global-to-Local {s=0.81, θ=2.07°, Tx=−14.97, Ty=−15.43}, (3) Local Registration with regularization constraints. This is clearly shown in FIG. (5) where the following extreme cases have been considered for demonstration purposes: A global rigid transformation with alpha=1.0 is shown in FIG. 5.1. A global-to-local rigid transformation with local deformations with alpha=0.5 is shown in FIG. 5.2, and a local pixel-wise registration model with alpha=0.0 is shown in FIG. 5.3. Registration performance of the disclosed framework was optimal/same in all cases.

The selected representation preserves strong registration power since even the complete pixel-wise local deformation field can be properly recovered in the cases of large displacements. It is important to note though that the use of a local deformation field introduces uncertainty on the registration process. The registered shape can differ from the original one and be an open structure.

5. Global-to-Local Registration with Uncertainties

A step forward to be done is to deal with the registration problem in more complex scenarios, where the target is not a shape or collection of points that is converted to a distance function image, but a shape model with local degrees of variability.

5.1. Shape Model

A stochastic framework with two unknown variables can be considered: The shape image, and the local degrees or variability of shape deformations. Similar models in a difference context have been disclosed. This model refers to a distance function that is associated with some variability measurements:

$$\Phi_S(x, y) = \begin{cases} 0, & (x, y) \in S \\ +ED((x, y), S) > 0 & (x, y) \in R_S \\ -ED((x, y), S) < 0 & (x, y) \in [\Omega - R_S] \end{cases} \quad (17)$$

Then, for a given pixel location (x, y) and a given value, conditional probability of having this value at the location in S is given by:

$$P_{s(x,y)}(\phi) = \frac{1}{\sqrt{2\pi}\,\sigma_S(x, y)} e^{-\frac{(\phi - \Phi_S(x,y))^2}{2\sigma_S^2(x,y)}} \quad (18)$$

5.2. Stochastic Registration

Given this model, a more challenging and promising approach is to register a given shape D by maximizing the joint density between the model and the input shape. If we assume that the conditional densities of the model are independent across pixels, then the optimization criterion is equivalent with the maximization of:

$$p(S, \theta, T, (U, V) | \Phi_D, \Phi_S, \sigma_S) = \quad (19)$$
$$\alpha \prod_\Omega p_{S(A)}(S\Phi_D) + (1-\alpha) \prod_\Omega p_{S(A+(U,V))}(S\Phi_D)$$

that is combined with the regularization term, leading to the following minimization criterion:

$$E(S, \theta, T, (U, V)) = \alpha \int\int_\Omega N_{\delta_1}(\Phi_D, \Phi_S)\left(\log(\sigma_S(A)) + \frac{(\Phi_D - \Phi_S(A))^2}{2\sigma_S^2(A)}\right) d\Omega + \quad (20)$$
$$(1-\alpha)\beta \int\int_\Omega N_{\delta_2}(\Phi_D, \Phi_S)\left(\log(\sigma_S(A+(U, V))) + \frac{(\Phi_D - \Phi_S(A+(U, V)))^2}{2\sigma_S^2(A+(U, V))}\right) d\Omega +$$

-continued $$(1-\alpha)(1-\beta)\int\int_\Omega N_{\delta_2}(S\Phi_D, \Phi_S)(U_x^2 + U_y^2 + V_x^2 + V_y^2)d\Omega$$

A gradient descent method can be used for the minimization of the defined functional. The obtained motion equations are similar to the ones obtained using the Sum of Squared Differences. Furthermore, they can account for the variability of the shape model. As a consequence, the contributions of pixel locations with high variability are less significant than the ones with high confidence in the prior model.

6. Conclusions

A novel and relatively simple framework has been disclosed based on variational principles for global to local shape registration. The disclosed framework makes use of Euclidean distance maps as feature space. Variational principles lead to a scale/rotation/translation invariant paradigm for shape registration. The extension of the method to deal with higher dimensions as well as with open structures is currently investigated. Encouraging experimental results (see, e.g., FIGS. 6 through 10) were obtained using variations of the disclosed formulation.

Returning now to FIG. 6, Rigid Registration for rigid objects (1) F-16, (2) F-15, (3) F-22 are shown. Each row corresponds to a different source where the target is the same. Different initial conditions are considered for each case and shown in different columns, as is the registration result.

The efficiency of the disclosed formulation is demonstrated using a simple optimization criterion, the sum of squared differences. Therefore, based on the experimental validation one can conclude that the selected shape representation has strong registration/discrimination power. Moreover, it can deal with occlusions and local deformations. In order to validate the presently disclosed approach, we have considered cases with partial occlusions, local deformations and randomly generated motion between the source and the target shape. These shapes were part of the same family (see FIGS. 7, 8 and 9). Random global transformations have been applied to the source shape using a 4-D variable defined in the registration space (s, θ, $T_x$, $T_y$):

$$\theta \in \left[-\frac{\pi}{3}, \frac{\pi}{3}\right], \quad (21)$$

$$S \in [0.8, 1.2],$$

$$(T_x, T_y) \in [-30, 30] \times [-30, 30]$$

For all examples, 100 trials were run using a random generation process for the parameters of the rigid transformation. In all cases the source and the target were different. The obtained results are shown in [FIGS. (7,8,9)]. Each column corresponds to a different trial. The first row of the trial (a) refers to the initial condition and the second row (b) to the final registration result. A small portion of the initial conditions (100) is presented for demonstration purposes in [FIGS. (7,8,9)]. The performance of the registration method (registration ratio) is also given for each case. Ground truth is available within the validation process. Therefore, the method performance registration ratio is defined as the number of successful recoveries for registration parameters divided by the number of trials. We can observe that when strong local deformations are not present the disclosed framework converges to the same global minimum for all trials under different initial conditions of FIGS. 7 and 8.

One can assume given the experimental results that the disclosed objective function defined in the Euclidean distance space is smooth and continuous. As a consequence, a gradient descent method can converge to the global minimum. It is interesting to note that even in the case of heavily partial deformed shapes such as shown in FIG. 9, the objective function seems to exhibit a similar behavior. For example, when fingers are progressively hidden from the "hand" subject, the method converges always to one of the three local minima and one global. Although the experimental results are satisfactory, one can predict reduced performance when symmetric shapes are to be registered. Symmetries will create similar transform representations that can cause convergence to local minima.

As described for FIG. 7, empirical evaluation is indicated for (a) Initial Conditions, and (b) Registration Result, with Performance or Registration Ratios of 100% in each case. The computational cost of the presently disclosed approach depends on several factors. Initial conditions, size of the target and the source and coupling between the global model and the local deformations are the main parameters involved in this procedure. The use of classical numerical methods is a significant drawback due to the requirement of significantly small time step to guarantee stability. One can consider the use of more elaborated techniques, some of which are under investigation, which will lead to a real time approach regarding the global motion model.

Thus, FIG. 9 shows empirical evaluation with (a) Initial conditions, and (b) registration results for performance registration ratios of (i) 100%, and (ii) 77%. While FIG. 10 shows rigid registration for non-rigid objects that exhibit synthetic motion, where each row corresponds to a different case, with (a) initial conditions, (b and c) intermediate results, and (d) registration results.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for non-rigid image registration using distance functions, the method comprising:
    receiving a source shape comprising uncertainties and a target shape;
    creating an augmented registration space comprising a plurality of target shape clones coherently positioned in an information space;
    considering a global linear parametric registration model and a corresponding local pixel-wise deformation field resulting in a non-rigid registration paradigm for the target shape;
    recovering both of the global linear parametric registration model and the corresponding local pixel-wise deformation field simultaneously through a gradient-descent method;
    integrating at least one global linear parametric registration model with local deformations from at least one corresponding local pixel-wise deformation field to assess the source shape;
    optimizing a functional defined on a parameter or feature space, the functional quantifying the similarity between the source shape and at least one target shape or target shape clone in terms of distance functions; and
    registering the source shape by seeking mutual correspondences between the source shape, the target shape and the target shape clones.

2. A method as defined in claim 1 wherein optimizing comprises selecting a mathematical framework by finding an optimum of at least one functional to quantify the similarity between the source shape and at least one target shape.

3. A method as defined in claim 2 wherein the mathematical framework is defined by at least one of variational and stochastic principles.

4. A method as defined in claim 1 wherein optimizing comprises the use of a gradient-descent method within the mathematical framework.

5. A method as defined in claim 1 wherein the information space is greater than a two-dimensional image plane.

6. An apparatus for non-rigid image registration using distance functions, the apparatus comprising:
    a receiving unit for receiving a source shape comprising uncertainties and a target shape;
    a cloning unit in signal communication with the optimizing unit for creating an augmented registration space comprising a plurality of target shape clones coherently positioned in the information space;
    an integrating unit in signal communication with the receiving unit for considering a global linear parametric registration model and a corresponding local pixel-wise deformation field resulting in a non-rigid registration paradigm for the target shape, recovering both of the global linear parametric registration model and the corresponding local pixel-wise deformation field simultaneously through a gradient-descent method, and integrating at least one global linear parametric registration model with local deformations from at least one corresponding local pixel-wise deformation field to assess the source shape;
    an optimizing unit in signal communication with the integrating unit for optimizing a functional defined on a parameter or feature space, the functional quantifying the similarity between the source shape and at least one target shape or target shape clone in terms of distance functions; and
    a registration unit in signal communication with the tracking unit for registering the source shape by seeking mutual correspondences between the source shape, the target shape and the target shape clones.

7. A system for non-rigid image registration using distance functions, the system comprising:
    receiving means for receiving a source shape comprising uncertainties and a target shape;
    cloning means in signal communication with the optimizing means for creating an augmented registration space comprising a plurality of target shape clones coherently positioned in the information space;
    integrating means in signal communication with the receiving means for considering a global linear parametric registration model and a corresponding local pixel-wise deformation field resulting in a non-rigid registration paradigm for the target shape, recovering both of the global linear parametric registration model and the corresponding local pixel-wise deformation field simultaneously through a gradient-descent method, and integrating at least one global linear parametric registration model with local deformations from at least one corresponding local pixel-wise deformation field to assess the source shape;
    optimizing means in signal communication with the integrating means for optimizing a functional defined on a parameter or feature space, the functional quantifying the similarity between the source shape and at least one target shape or target shape clone in terms of distance functions; and
    registration means in signal communication with the tracking means for registering the source shape by seeking mutual correspondences between the source shape, the target shape and the target shape clones.

8. A computer program storage device read able by a computer, tangibly embodying a program of instructions executable by the computer to perform program steps for non-rigid image registration using distance functions, the program steps comprising:
    receiving a source shape comprising uncertainties and a target shape;
    creating an augmented registration space comprising a plurality of target shape clones coherently positioned in the information space;

considering a global linear parametric registration model and a corresponding local pixel-wise deformation field resulting in a non-rigid registration paradigm for the target shape, recovering both of the global linear parametric registration model and the corresponding local pixel-wise deformation field simultaneously through a gradient-descent method, and integrating at least one global linear parametric registration model with local deformations from at least one corresponding local pixel-wise deformation field to assess the source shape;

optimizing a functional defined on a parameter or feature space, the functional quantifying the similarity between the source shape and at least one target shape or target shape clone in terms of distance functions; and registering the source shape by seeking mutual correspondences between the source shape, the target shape and the target shape clones.

9. A method as defined in claim 1, further comprising:
receiving the source shape comprising uncertainties and the target shape into an image space;
cloning the target shape within the image space; and
computing a distance map responsive to the cloned target shape by calculating a minimum distance from each point in the image space to a closest portion of the cloned target shape.

10. A method as defined in claim 9, further comprising performing a global registration that is invariant to rotation, translation and scale, by minimizing an energy cost function in the information space.

11. A method as defined in claim 10 wherein the energy function is optimized to recover global registration parameters for the source shape.

12. A method as defined in claim 10, further comprising minimizing the energy cost function using a gradient-descent method.

13. A method as defined in claim 12, further comprising estimating local deformations from the global registration to optimize the fit of a source shape to the target shape.

14. A method as defined in claim 10 wherein the energy function is responsive to local deformations.

15. A method as defined in claim 14 wherein the global transformation and the local deformations are combined using a local deformation file.

16. A method as defined in claim 15 wherein the local deformation file meets a regular and smooth regularity constraint.

17. A method as defined in claim 16, further comprising minimizing the energy cost function using a gradient-descent method.

18. A method as defined in claim 12, further comprising registering the source shape to a shape model.

19. A method as defined in 18 wherein a global-to-local registration is optimized in accordance with the local quality of the model.

20. A method as defined in claim 19, further comprising minimizing a stochastic cost function in accordance with the quality of the model.

21. A method as defined in claim 20, further comprising minimizing the energy cost function using a gradient-descent method.

* * * * *